(12) United States Patent
Ha et al.

(10) Patent No.: US 11,414,045 B2
(45) Date of Patent: Aug. 16, 2022

(54) ANCHOR POSITION ADJUSTMENT DEVICE

(71) Applicant: Sanoh Industrial Co., Ltd., Tokyo (JP)

(72) Inventors: Huy Hung Ha, Koga (JP); Masayuki Hoshi, Koga (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 109 days.

(21) Appl. No.: 16/629,453

(22) PCT Filed: Jul. 9, 2018

(86) PCT No.: PCT/JP2018/025897
§ 371 (c)(1),
(2) Date: Jan. 8, 2020

(87) PCT Pub. No.: WO2019/013168
PCT Pub. Date: Jan. 17, 2019

(65) Prior Publication Data
US 2020/0216015 A1  Jul. 9, 2020

(30) Foreign Application Priority Data
Jul. 10, 2017 (JP) .............................. JP2017-134770

(51) Int. Cl.
*B60R 22/20* (2006.01)
*B60R 22/24* (2006.01)

(52) U.S. Cl.
CPC .............. *B60R 22/20* (2013.01); *B60R 22/24* (2013.01)

(58) Field of Classification Search
CPC ..... B60R 22/20; B60R 22/201; B60R 22/202; B60R 22/203; B60R 22/206; B60R 22/24
See application file for complete search history.

(56) References Cited

U.S. PATENT DOCUMENTS

| 4,917,403 A | * | 4/1990 | Gyoda | ............... B60R 22/203 248/297.31 |
| 5,655,793 A | * | 8/1997 | Isonaga | ............... B60R 22/203 280/801.2 |

(Continued)

FOREIGN PATENT DOCUMENTS

| CN | 201128403 Y | 10/2008 |
| CN | 101573259 A | 11/2009 |

(Continued)

OTHER PUBLICATIONS

Machine translation of CN 106608244 A. [Retrieved from Internet (Jan. 21, 2022)]. (Year: 2022).*

(Continued)

*Primary Examiner* — Barry Gooden, Jr.
(74) *Attorney, Agent, or Firm* — Procopio, Cory, Hargreaves & Savitch LLP (57) ABSTRACT

An anchor position adjustment device includes a guide rail having a plurality of engagement recess portions formed to be arranged, a moving member attached to the guide rail, a lock pin-provided in the moving member, a first biasing member biasing the lock pin in an inserting direction of the lock pin with respect to the engagement recess portions, a release pin extending from the lock pin, and an operation member attached to the moving member in a slidable manner. The operation member has a release inclination surface guiding the release pin in a pulling direction of the lock pin with respect to the engagement recess portions in accordance with sliding of the operation member, and a release inhibition surface inhibiting the lock pin from being pulled out from the engagement recess portion in a pre-slide state.

3 Claims, 12 Drawing Sheets

(56) References Cited

U.S. PATENT DOCUMENTS

| | | | | |
|---|---|---|---|---|
| 5,725,248 A | * | 3/1998 | Inoue | B60R 22/203 |
| | | | | 280/801.2 |
| 7,198,300 B2 | * | 4/2007 | Daume | B60R 22/203 |
| | | | | 280/801.1 |
| 2005/0242563 A1 | | 11/2005 | Daume et al. | |
| 2005/0253366 A1 | * | 11/2005 | Uno | B60R 22/203 |
| | | | | 280/730.2 |

FOREIGN PATENT DOCUMENTS

| | | | |
|---|---|---|---|
| CN | 105196962 A | | 12/2015 |
| CN | 205632393 U | | 10/2016 |
| CN | 106608244 A | | 5/2017 |
| DE | 102007047441 A1 | | 8/2008 |
| EP | 173477 A2 | | 3/1986 |
| GB | 2125274 A | | 3/1984 |
| JP | S59-119848 U | | 8/1984 |
| JP | 01273749 A | * | 11/1989 ........... B60R 22/203 |
| JP | H1-273749 A | | 11/1989 |
| JP | H09-039731 A | | 2/1997 |
| JP | 2783985 B2 | | 8/1998 |
| JP | 2832168 B | | 12/1998 |
| JP | 2010280337 A | | 12/2010 |
| JP | 2011-079404 A | | 4/2011 |
| JP | 5319481 B | | 10/2013 |
| JP | 2016-199142 A | | 12/2016 |
| WO | WO-2006070851 A1 | * | 7/2006 ........... B60R 22/203 |

OTHER PUBLICATIONS

International Search Report and Written Opinion for related International Application No. PCT/JP2018/025897, dated Sep. 4, 2018 (2 pages).

International Preliminary Report on Patentability for related PCT App No. PCT/JP2018/025897 dated Jan. 23, 2020, 7 pgs.

Extended European Search Report for related EP App No. 18831553.5 dated Oct. 26, 2020, 6 pgs.

* cited by examiner

ANCHOR POSITION ADJUSTMENT DEVICE

CROSS-REFERENCE TO RELATED APPLICATIONS

This application is a U.S. National Stage entry of PCT Application No: PCT/JP2018/025897 filed Jul. 9, 2018, which claims priority to Japanese Patent Application No. 2017-134770, filed Jul. 10, 2017, the contents of which are incorporated herein by reference.

TECHNICAL FIELD

An aspect of the present invention relates to an anchor position adjustment device adjusting a position of an anchor supporting a seatbelt.

BACKGROUND ART

In the related art, vehicles such as automobiles are equipped with seatbelt devices for protecting occupants seated in seats. Such seatbelt devices include a three-point seatbelt device. A seatbelt in a three-point seatbelt device includes a shoulder belt which is supported by an anchor attached to a vehicle body and restrains the shoulder, the chest, and the waist of an occupant; and a lap belt which is formed to be connected to the shoulder belt and restrains the waist of the occupant.

Patent Literature 1 discloses an anchor position adjustment device adjusting a position of an anchor supporting a shoulder belt. The term "webbing" disclosed in Patent Literature 1 is a synonym of the seatbelt disclosed in the specification of this application. In the anchor position adjustment device disclosed in Patent Literature 1, a moving member (22) having the anchor attached thereto is attached to a guide rail (12) fixed to the vehicle body in a slidable manner in a vehicle up-down direction. Further, a lock pin (34) provided in the moving member (22) is inserted into a recess portion (20) of the guide rail (12) due to a biasing force of a compression coil spring (40). Consequently, the lock pin (34) and the recess portion (20) engage with each other, and movement of the moving member (22) with respect to the guide rail (12) is restricted.

In addition, an operation frame (42) for causing the lock pin (34) and the recess portion (20) to be disengaged from each other is provided in the anchor position adjustment device disclosed in Patent Literature 1. An operation surface (42A) which is inclined while abutting an extension portion (34A) extending from the lock pin (34) is formed in the operation frame (42). Therefore, when the operation frame (42) slides, the extension portion (34A) is guided to the operation surface (42A), and therefore the lock pin (34) is pulled out from the recess portion (20). Consequently, the lock pin (34) and the recess portion (20) are disengaged from each other, and restriction on movement of the moving member (22) with respect to the slide rail (12) is released. Thus, the moving member (22) can be moved upward and downward with respect to the guide rail (12).

CITATION LIST

Patent Literature

Patent Literature 1: Japanese Patent No. 5319481

SUMMARY OF INVENTION

Technical Problem

In an anchor position adjustment device disclosed in Patent Literature 1, when significant vibration is generated in a vehicle due to a lateral collision or the like, there is a possibility that a lock pin may be pulled out from a recess portion due to an inertial force of the lock pin against a biasing force of a compression coil spring and the lock pin and the recess portion may be disengaged from each other. When the lock pin and the recess portion are disengaged from each other, there is a possibility that a moving member (22) may move with respect to a guide rail (12).

Here, an object of an aspect of the present invention is to provide an anchor position adjustment device in which a moving member can be prevented from moving with respect to a guide rail when significant vibration is generated in a vehicle.

Solution to Problem

According to an aspect of the present invention, there is provided an anchor position adjustment device adjusting a position of an anchor supporting a seatbelt. The anchor position adjustment device includes a guide rail fixed to a vehicle body and having a plurality of engagement recess portions formed to be arranged in a first direction, a moving member attached to the guide rail in a slidable manner in the first direction and having the anchor attached thereto, a lock pin provided in the moving member such that the lock pin is able to move in an inserting/pulling direction with respect to the engagement recess portions, a biasing member biasing the lock pin in an inserting direction of the lock pin with respect to the engagement recess portions, a release pin extending in a direction intersecting with the inserting/pulling direction from the lock pin, and an operation member attached to the moving member in a slidable manner. The operation member has a release inclination surface guiding the release pin in a pulling direction of the lock pin with respect to the engagement recess portions in accordance with sliding of the operation member, and a release inhibition surface inhibiting the lock pin from being pulled out from the engagement recess portion in a pre-slide state before the operation member slides.

In this anchor position adjustment device, when the lock pin is inserted into the engagement recess portion due to a biasing force of the biasing member, the lock pin and the engagement recess portion engage with each other, and movement of the moving member with respect to the guide rail is restricted. Further, when the operation member slides, the release inclination surface guides the release pin, and therefore the lock pin is pulled out from the engagement recess portion. Consequently, the lock pin and the engagement recess portion are disengaged from each other, and thus restriction on movement of the moving member with respect to the guide rail is released. Therefore, the moving member can move with respect to the guide rail. Further, the release inhibition surface inhibiting the lock pin from being pulled out from the engagement recess portion in the pre-slide state is formed in the operation member. Therefore, the moving member can be prevented from moving with respect to the guide rail when significant vibration is generated in a vehicle.

The release inhibition surface may be positioned on a side opposite to the guide rail with respect to the release pin. In this anchor position adjustment device, the release inhibition surface is positioned on a side opposite to the guide rail with respect to the release pin. Therefore, even if significant vibration is generated in a vehicle and the lock pin is about to be pulled out from the engagement recess portion due to an inertial force, the release pin abuts the release inhibition surface, and therefore the lock pin can be better prevented from being pulled out from the engagement recess portion.

The release inhibition surface may extend in a direction orthogonal to the inserting/pulling direction. In this anchor position adjustment device, the release inhibition surface extends in a direction orthogonal to the inserting/pulling direction. Therefore, when significant vibration is generated in a vehicle and the release pin abuts the release inhibition surface, the operation member can be prevented from moving in the first direction. Consequently, the lock pin can be better prevented from being pulled out from the engagement recess portion.

Advantageous Effects of Invention

According to the aspect of the present invention, the moving member can be prevented from moving with respect to the guide rail when significant vibration is generated in a vehicle.

DESCRIPTION OF EMBODIMENT

Hereinafter, with reference to the drawings, an anchor position adjustment device according to an embodiment will be described. In each of the drawings, the same reference signs are applied to elements which are the same or corresponding, and duplicate description will be omitted. In addition, in the drawings, upward in a vehicle up-down direction is indicated as "UP", and inward in a vehicle width direction is indicated as "IN".

Figure 1:
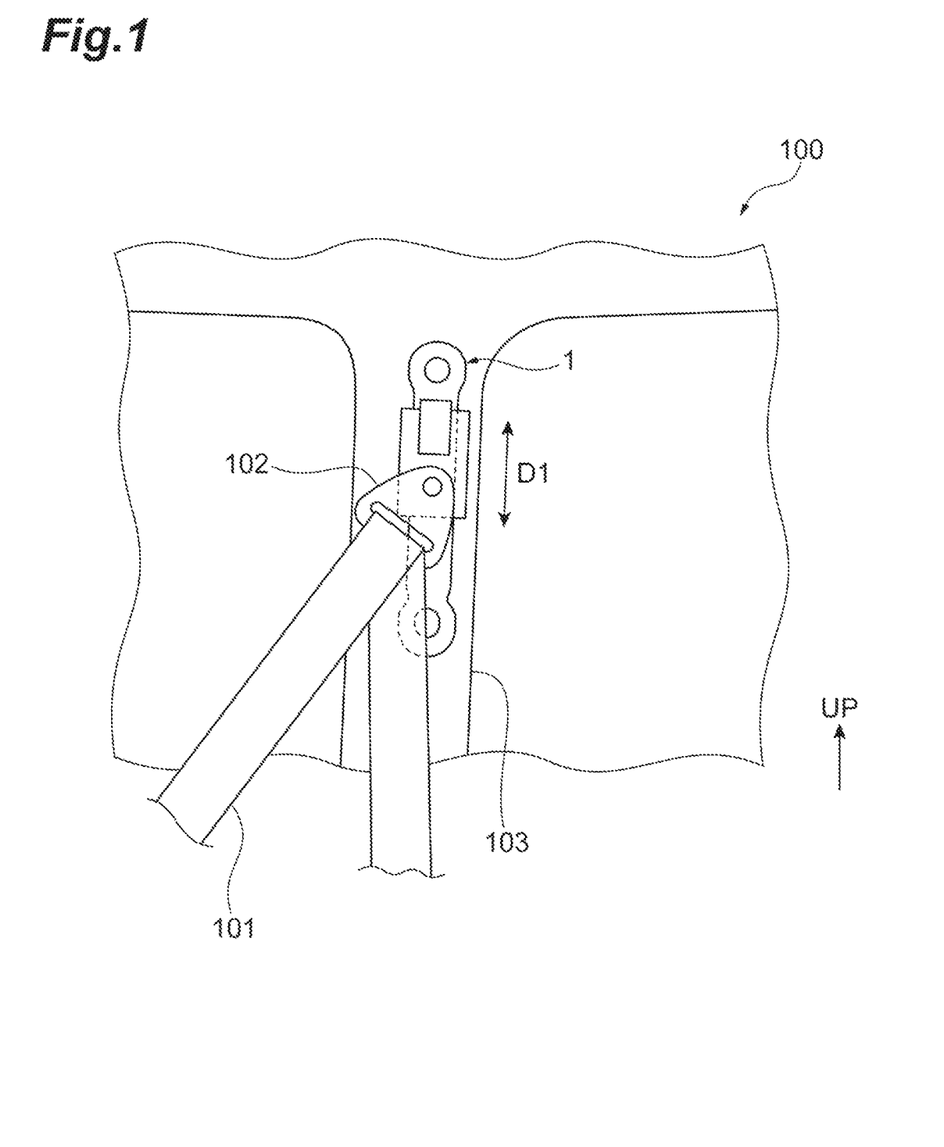
FIG. 1 is a view illustrating an inside of a vehicle in which an anchor position adjustment device of the present embodiment is mounted.
Figure 2:
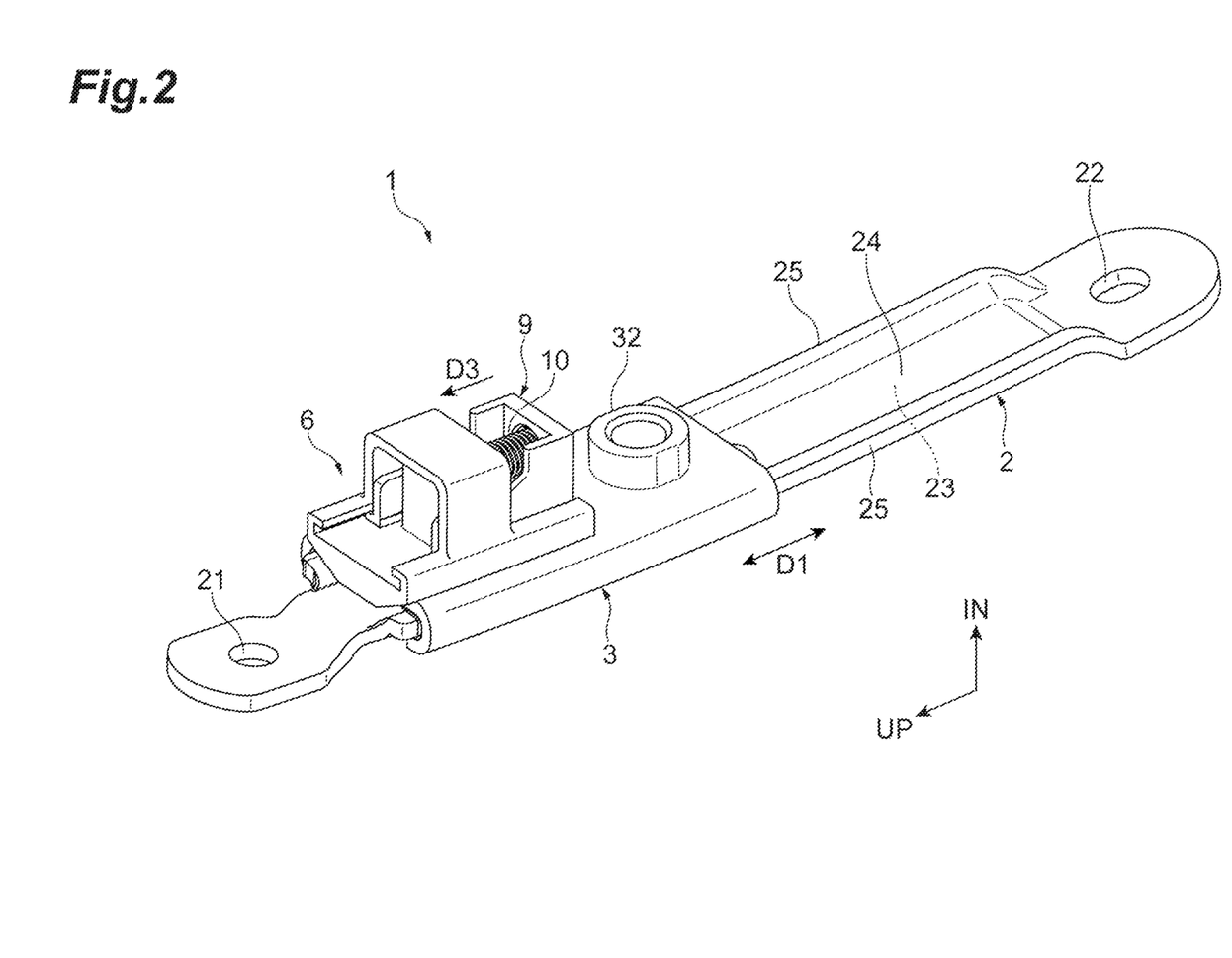
FIG. 2 is a perspective view of the anchor position adjustment device of the present embodiment.
Figure 3:
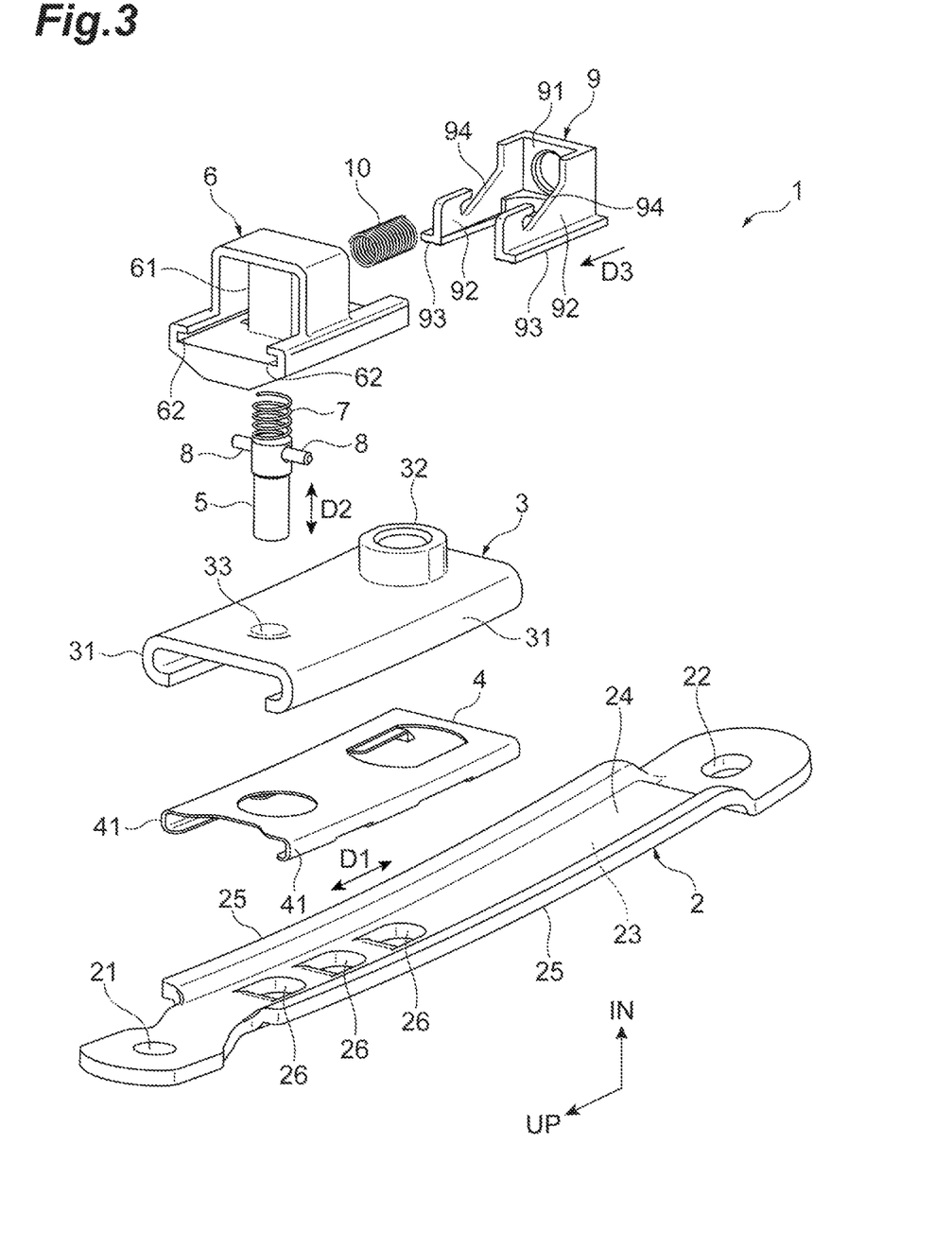
FIG. 3 is an exploded perspective view of the anchor position adjustment device of the present embodiment.
Figure 4:
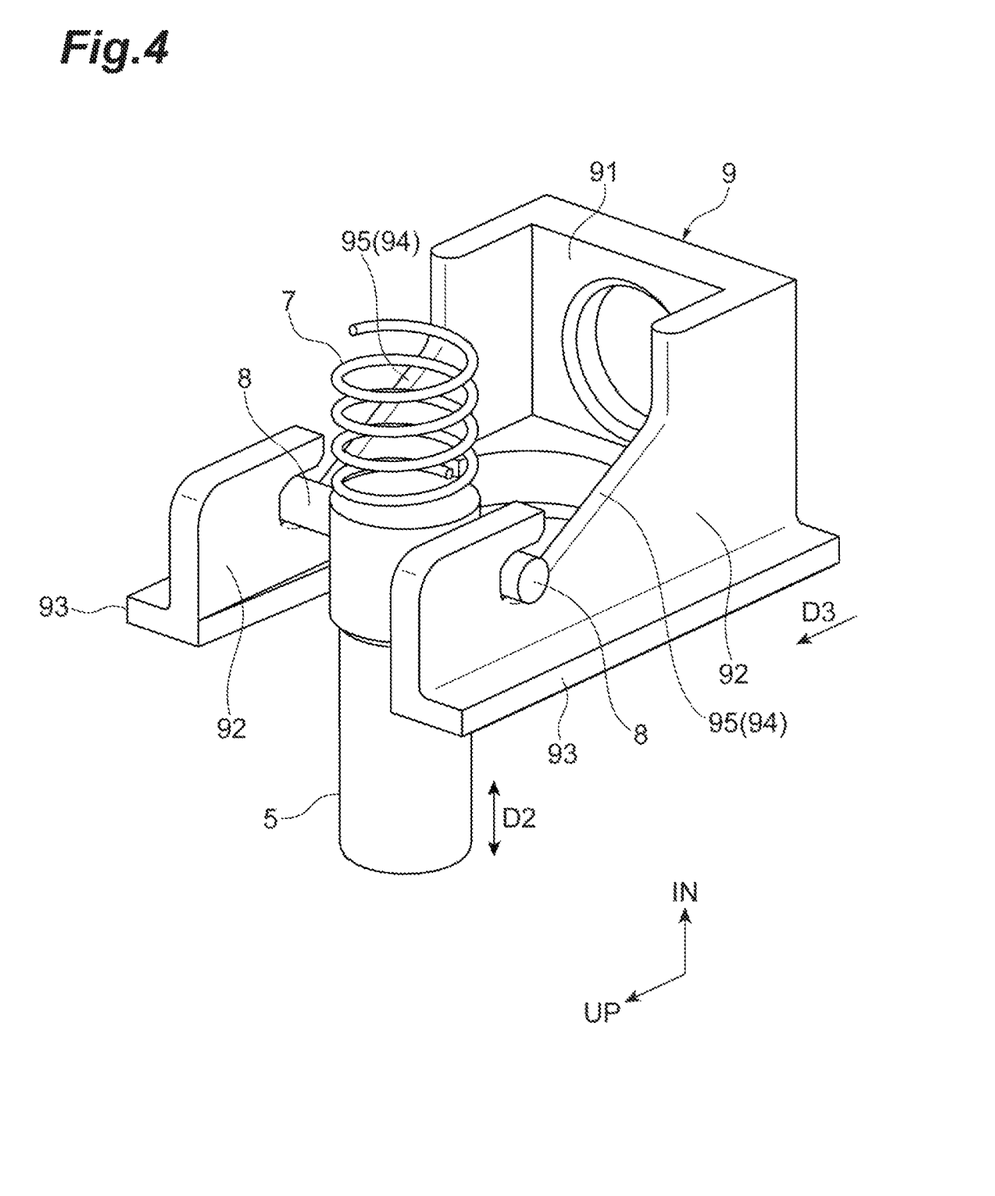
FIG. 4 is a perspective view illustrating a main portion of the anchor position adjustment device of the present embodiment.
Figure 5:
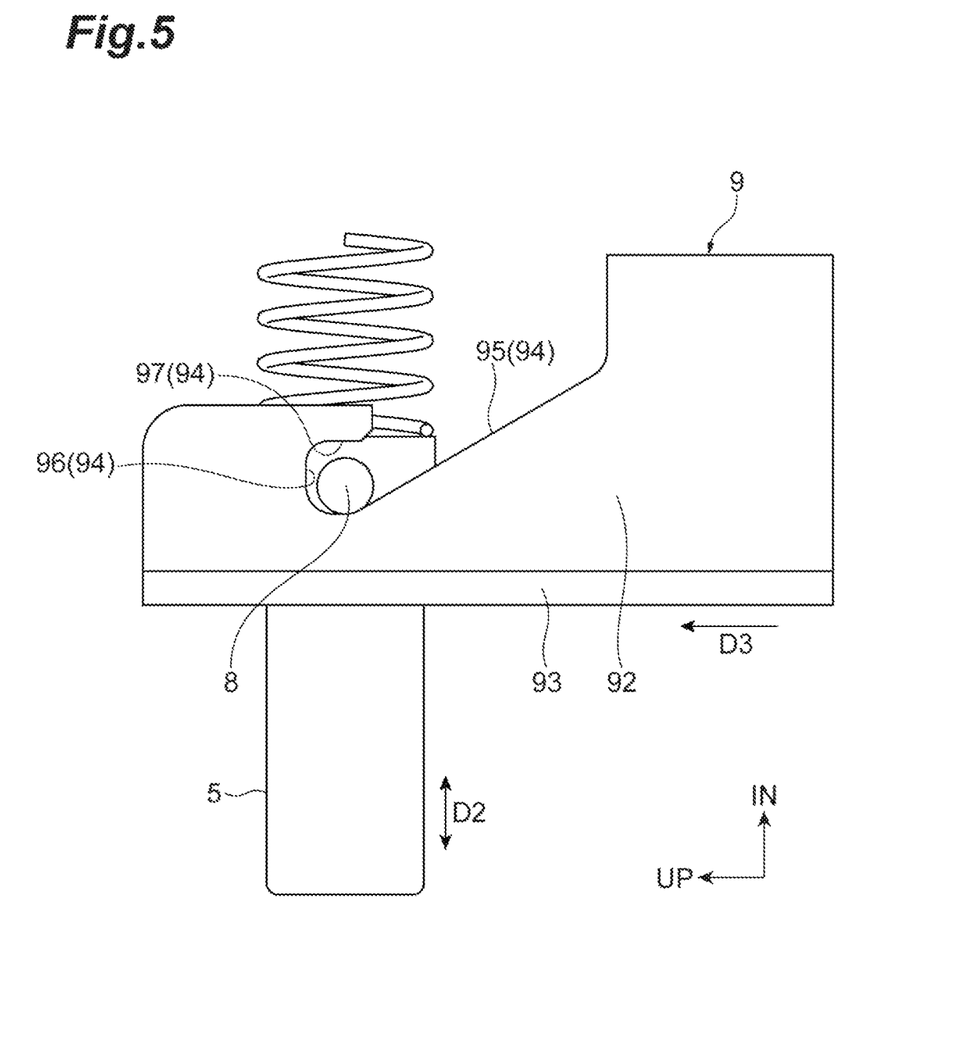
FIG. 5 is a front view illustrating the main portion of the anchor position adjustment device of the present embodiment.
Figure 6:
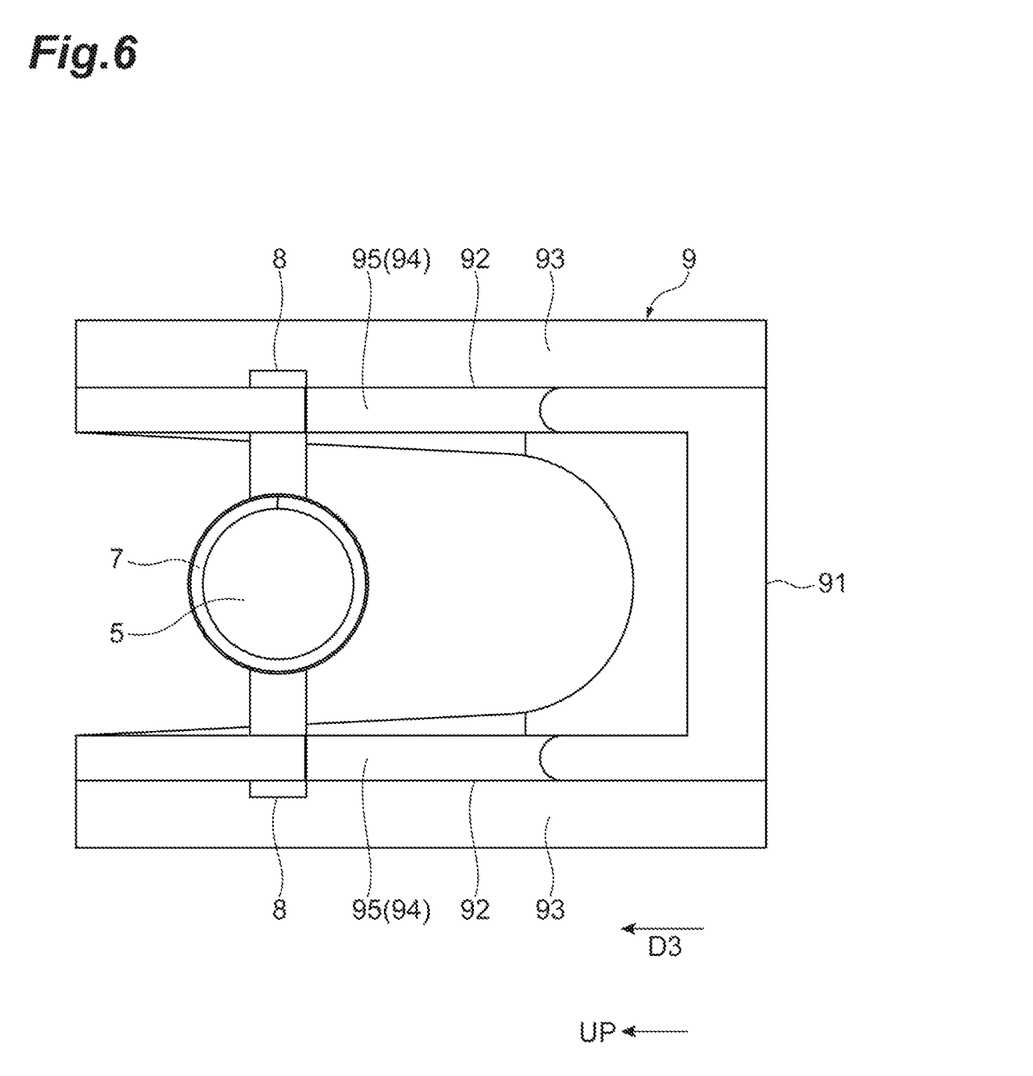
FIG. 6 is a side view illustrating the main portion of the anchor position adjustment device of the present embodiment.
Figure 7:
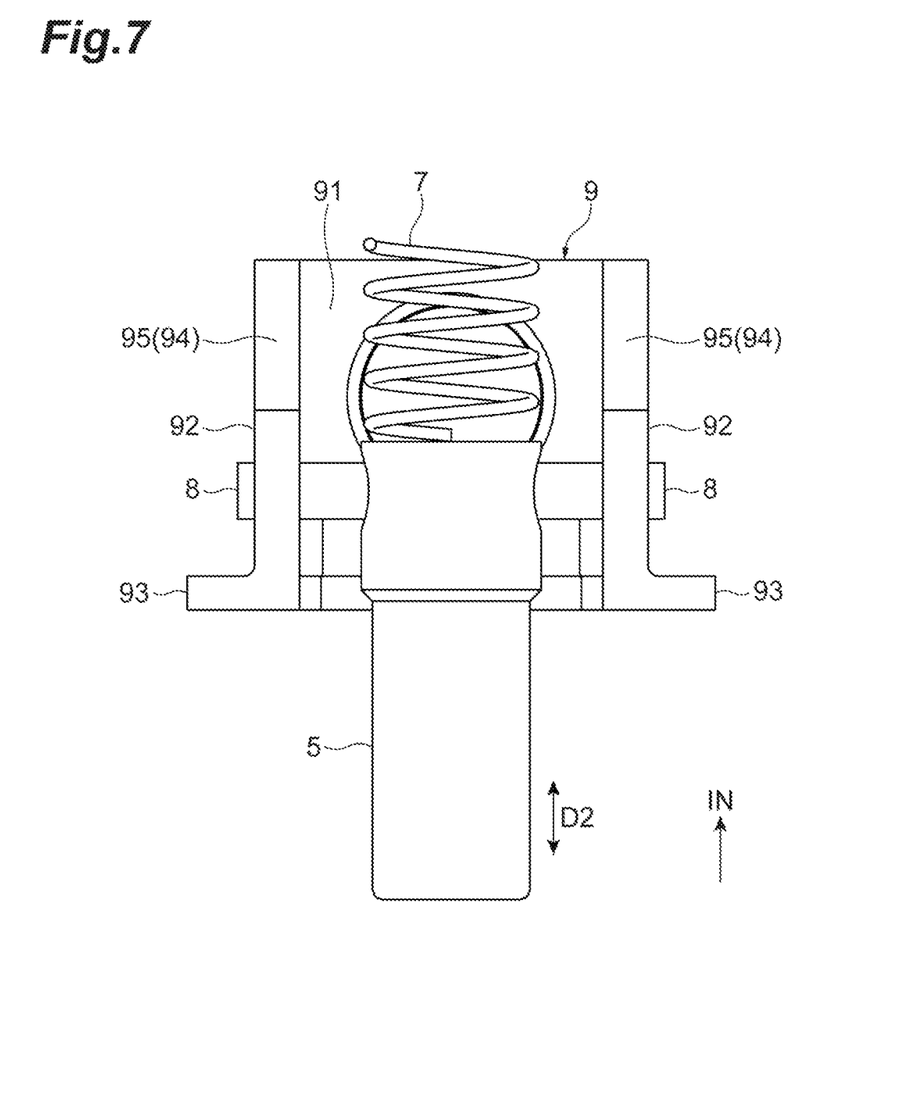
FIG. 7 is a plan view illustrating the main portion of the anchor position adjustment device of the present embodiment.

As illustrated in FIG. 1, an anchor position adjustment device 1 according to the present embodiment is a device which is mounted in a vehicle 100 and adjusts a position of an anchor 102 supporting a seatbelt 101. The seatbelt 101 is a shoulder belt which restrains the shoulder, the chest, and the waist of an occupant. The anchor 102 is a shoulder anchor supporting the shoulder belt.

As illustrated in FIGS. 1 to 7, the anchor position adjustment device 1 includes a guide rail 2, a moving member 3, a buffer plate 4, a lock pin 5, a holder 6, a first biasing member 7, release pins 8, an operation member 9, and a second biasing member 10.

The guide rail 2 is a member which is fixed to a vehicle body. The position of the vehicle body where the guide rail 2 is fixed is not particularly limited. In the present embodiment, the guide rail 2 is fixed to an inner surface in the vehicle width direction of a pillar 103 (center pillar) extending in the vehicle up-down direction. The guide rail 2 is formed of a metal material in an elongated plate shape.

An upper fixing portion 21 and a lower fixing portion 22 to be fixed to the pillar 103 are formed in both end portions of the guide rail 2 in a longitudinal direction. Further, the guide rail 2 is fixed to the pillar 103 in the upper fixing portion 21 and the lower fixing portion 22 such that the upper fixing portion 21 is disposed on the upper side in the vehicle up-down direction and the lower fixing portion 22 is disposed on the lower side in the vehicle up-down direction. The upper fixing portion 21 and the lower fixing portion 22 can be fixed to the pillar 103 by bolt fastening, for example. When the inner surface in the vehicle width direction of the pillar 103 where the guide rail 2 is fixed is slightly curved, the guide rail 2 is also formed to be slightly curved along the curved shape of the pillar 103. A surface, of front and rear surfaces of the guide rail 2, on the pillar 103 side will be referred to as an outer surface 23, and a surface on a side opposite to the pillar 103 will be referred to as an inner surface 24.

A pair of rail portions 25 and 25 are formed in both end portions in a width direction of the guide rail 2. The width direction of the guide rail 2 indicates a direction orthogonal to the longitudinal direction of the guide rail 2 and is a direction which becomes a vehicle front-rear direction when the guide rail 2 is fixed to the vehicle body. The pair of rail portions 25 and 25 extend parallel to each other in the longitudinal direction of the guide rail 2 (vehicle up-down direction).

A plurality of engagement recess portions 26 arranged in a first direction D1 are formed in a middle portion in the width direction of the guide rail 2 positioned between the pair of rail portions 25 and 25. The first direction D1 is a direction in which the position of the anchor 102 is adjusted and is an extending direction of the pair of rail portions 25 and 25 in the present embodiment. A part of the engagement recess portion 26 on the upper fixing portion 21 side is formed as an inclination surface inclined from the outer surface 23 side to the inner surface 24 side, and a part of the engagement recess portion 26 on the lower fixing portion 22 side is formed to have an arc shape. The engagement recess portion 26 need only be recessed from a surface facing a side inward in the vehicle width direction of the guide rail 2, and any shape and any structure may be adopted. For example, the engagement recess portions 26 may be holes which penetrate the guide rail 2 or may be depressions which do not penetrate the guide rail 2. In addition, the number of engagement recess portions 26 is not particularly limited. For example, three engagement recess portions can be adopted.

The moving member 3 is a member which is attached to the guide rail 2 in a slidable manner in the first direction D1 and to which the anchor 102 is attached. As described above, the first direction D1 is a direction in which the position of the anchor 102 is adjusted and is an extending direction of the pair of rail portions 25 and 25 in the present embodiment. The moving member 3 is disposed on the inner surface 24 side of the guide rail 2. The moving member 3 is formed of a metal member in a rectangular plate shape.

A pair of slide portions 31 and 31 are formed in both end portions in the width direction of the moving member 3. Both end portions in the width direction of the moving member 3 indicates a direction orthogonal to the longitudinal direction of the guide rail 2 and is a direction which becomes the vehicle front-rear direction when the guide rail 2 is fixed to the vehicle body. The pair of slide portions 31 and 31 are formed to have U-shapes facing each other, and the pair of rail portions 25 and 25 are respectively inserted thereinto in a slidable manner. Therefore, when the pair of slide portions 31 and 31 are guided to the pair of rail portions 25 and 25, the moving member 3 can slide in the first direction D1 (extending direction of the pair of rail portions 25 and 25) with respect to the guide rail 2.

An anchor attachment portion 32 and a penetration hole 33 are formed in the middle portion in the width direction of the moving member 3 positioned between the pair of slide portions 31 and 31. The anchor attachment portion 32 is a part for attaching the anchor 102. For example, the anchor attachment portion 32 is formed to have a nut shape, and a bolt for rotatably holding the anchor 102 can be screwed thereinto. The penetration hole 33 is a hole into which the lock pin 5 is inserted. The penetration hole 33 is formed on a line along which the plurality of engagement recess portions 26 are arranged in a state where the moving member 3 is attached to the guide rail 2.

The buffer plate 4 is a member which functions as a buffer material between the guide rail 2 and the moving member 3. The buffer plate 4 is disposed between the guide rail 2 and the moving member 3. The buffer plate 4 is formed of a resin material in a rectangular plate shape softer (lower in hardness) than the guide rail 2 and the moving member 3. A pair of slide portions 41 and 41 corresponding to the pair of slide portions 31 and 31 of the moving member 3 are formed in both end portions in the width direction of the buffer plate 4. The pair of slide portions 41 and 41 are formed to have U-shapes facing each other. Further, the pair of slide portions 41 and 41 are respectively disposed on the inner side of the pair of slide portions 31 and 31, and the pair of rail portions 25 and 25 are inserted thereinto in a slidable manner.

The lock pin 5 is a member which is provided in the moving member 3 such that it can move in an inserting/pulling direction D2 with respect to the engagement recess portions 26. The lock pin 5 is formed of a metal material in a pin shape (rod shape). The lock pin 5 is inserted into the penetration hole 33 of the moving member 3 such that it can be inserted into any engagement recess portion 26. When the lock pin 5 is inserted into any engagement recess portion 26, it engages with the engagement recess portion 26 and restricts movement of the moving member 3 with respect to the guide rail 2.

The holder 6 is a member which is provided to allow the lock pin 5 to move in the inserting/pulling direction D2 with respect to the moving member 3. The holder 6 is disposed on a side of the moving member 3 opposite to the guide rail 2 and is fixed to the moving member 3. The holder 6 can be fixed to the moving member 3 by caulking a rivet, for example.

A lock pin support portion 61 is formed in the middle portion in the width direction of the holder 6. Similar to the width direction of the guide rail 2, the width direction of the holder 6 indicates a direction orthogonal to the longitudinal direction of the guide rail 2. The lock pin support portion 61 is a part for supporting the lock pin 5 in a slidable manner in an axial direction of the lock pin 5 such that the lock pin 5 can move in the inserting/pulling direction D2 with respect to the moving member 3. The lock pin support portion 61 is formed to have a tubular shape, and an end portion of the lock pin 5 on a side opposite to the guide rail 2 is inserted into the lock pin support portion 61.

A pair of slide grooves 62 and 62 are formed in both end portions in the width direction of the holder 6. The pair of slide grooves 62 and 62 are grooves for holding the operation member 9 in a slidable manner and open in directions toward each other.

The first biasing member 7 is a member which biases the lock pin 5 in an inserting direction (to the guide rail 2 side) of the lock pin 5 with respect to the engagement recess portions 26. Biasing the lock pin 5 in the inserting direction of the lock pin 5 with respect to the engagement recess portions 26 indicates pushing the lock pin in the inserting direction of the lock pin 5 with respect to the engagement recess portions 26, that is, pushing the lock pin 5 to the guide rail 2 side. As the first biasing member 7, for example, an elastic expanding/contracting member such as a compression coil spring can be used. In this case, the first biasing member 7 is accommodated inside the lock pin support portion 61 on a side of the lock pin 5 opposite to the guide rail 2. Further, the first biasing member 7 biases the lock pin 5 in the axial direction of the lock pin 5, that is, in the inserting direction of the lock pin 5 with respect to the engagement recess portions 26. Consequently, the lock pin 5 is inserted into the engagement recess portion 26, and therefore a state where the lock pin 5 and the engagement recess portion 26 engage with each other is maintained.

The release pins 8 are members which extend in a direction intersecting with a moving direction of the lock pin 5 from the lock pin 5. The release pins 8 are formed of metal materials in a pin shape (rod shape). The release pins 8 may be integrated with the lock pin 5 or may be separate from the lock pin 5. When the release pins 8 are integrated with the lock pin 5, the release pins 8 become a part of the lock pin 5. In the present embodiment, a pair of release pins 8 and 8 extend from the lock pin 5, and the pair of release pins 8 and 8 respectively extend in directions orthogonal to the axial direction of the lock pin 5 and in directions opposite to each other. Therefore, the lock pin 5 and the pair of release pins 8 and 8 form a T-shape or a cross shape. The pair of release pins 8 and 8 may be constituted of separate members or may be constituted of one member.

The operation member 9 is a member which is attached to the moving member 3 in a slidable manner. The operation member is formed of a metal member. The operation member 9 is formed to have a U-shape to avoid the lock pin 5. The operation member 9 includes a base portion 91 extending in the width direction of the operation member 9, and a pair of side wall portions 92 and 92 respectively extending parallel to each other from both ends of the base portion 91. The base portion 91 is a part for assuring the rigidity of the operation member 9 and connecting the pair of side wall portions 92 and 92 to each other. The pair of side wall portions 92 and 92 are parts for pulling out the lock pin 5 inserted into the engagement recess portion 26 from the engagement recess portion 26.

A pair of rails 93 and 93 inserted into the pair of slide grooves 62 and 62 of the holder 6 in a slidable manner are formed in the pair of side wall portions 92 and 92. Further, when the pair of rails 93 and 93 slide with respect to the pair of slide grooves 62 and 62, the operation member 9 can slide in the first direction D1 with respect to the moving member 3.

In addition, a pair of abutment surfaces 94 and 94 which the pair of release pins 8 and 8 abut are formed in the pair of side wall portions 92 and 92. The pair of abutment surfaces 94 and 94 are surfaces which guide the pair of release pins 8 and 8. Details of the pair of abutment surfaces 94 and 94 will be described below.

As illustrated in FIGS. 1 to 9, a release inclination surface 95, a slide restriction surface 96, and a release inhibition surface 97 are formed in each of the pair of abutment surfaces 94 and 94.

Figure 8:
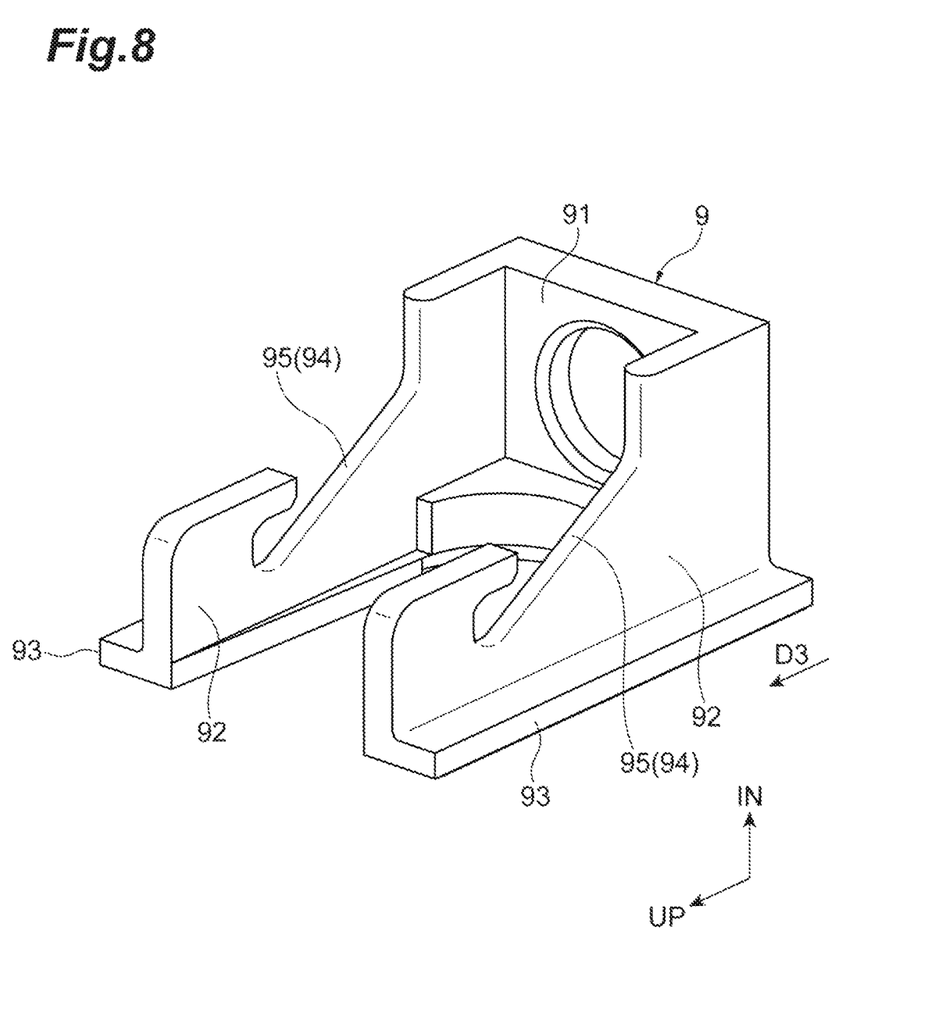
FIG. 8 is a perspective view illustrating an operation member of the present embodiment.
Figure 9:
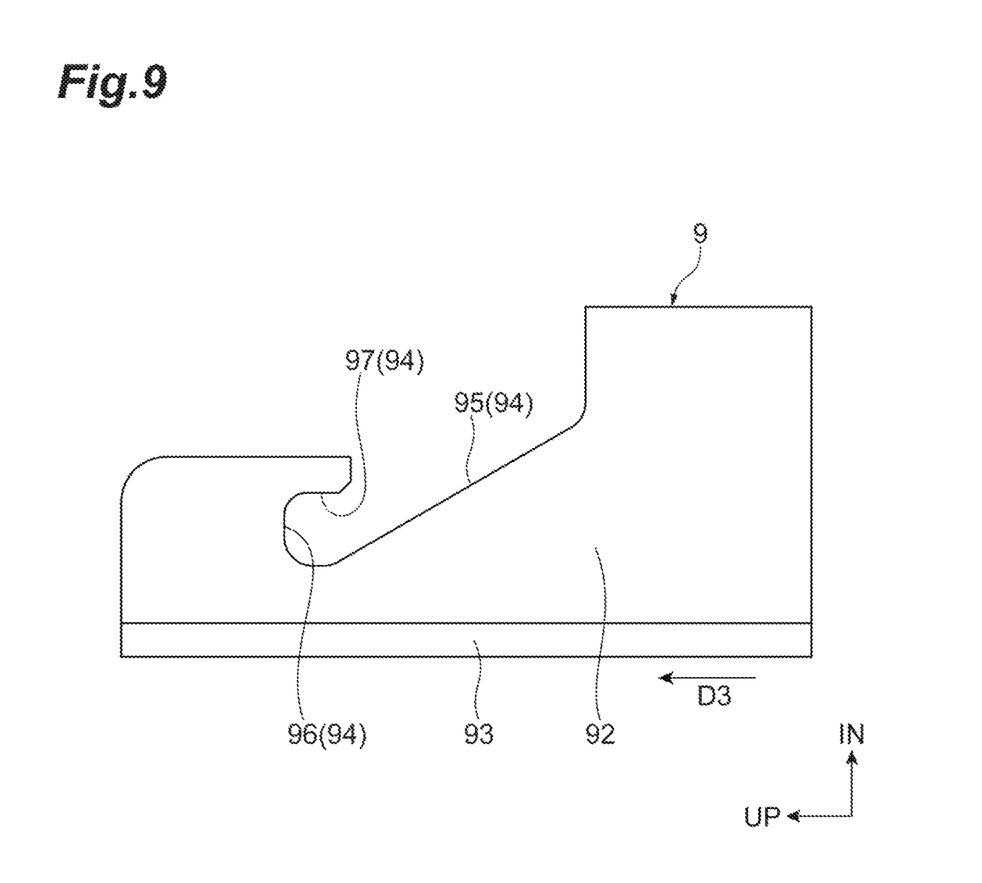
FIG. 9 is a front view illustrating the operation member of the present embodiment.

The release inclination surface 95 is a guide surface which guides the release pin 8 in a pulling direction of the lock pin 5 with respect to the engagement recess portion 26 in accordance with sliding of the operation member 9. The release inclination surface 95 is an inclination surface which is inclined in a direction away from the guide rail 2 with respect to the first direction D1 which is a slide direction of the operation member 9. As described above, the lock pin 5 is biased to the guide rail 2 side by the first biasing member 7. Therefore, the release pins 8 push the release inclination surfaces 95 to the guide rail 2 side and are positioned at the lowest positions (positions closest to the guide rail 2) on the release inclination surfaces 95. Consequently, the lock pin 5 is inserted into the engagement recess portion 26, so that the lock pin 5 and the engagement recess portion 26 are in an engaged state. Further, from this state, when the operation member 9 slides with respect to the holder 6, the release pins 8 are guided to the release inclination surfaces 95 and move in a direction away from the guide rail 2, and the lock pin 5 is pulled out from the engagement recess portion 26. Consequently, the lock pin 5 and the engagement recess portion 26 are disengaged from each other, and restriction on movement of the moving member 3 with respect to the guide rail 2 is released. Therefore, the moving member 3 can move with respect to the guide rail 2.

Here, a state where the lock pin 5 is inserted into the engagement recess portion 26 due to a biasing force of the first biasing member 7 and the lock pin 5 and the engagement recess portion 26 engage with each other, and a state before the operation member 9 slides will be referred to as a pre-slide state. Further, in the first direction D1 which is the slide direction of the operation member 9, a direction in which the operation member 9 slides from the pre-slide state and the lock pin 5 is pulled out from the engagement recess portion 26 will be referred to as an operation direction D3.

The slide restriction surface 96 is a guide surface in which the release pin 8 abuts such that sliding in a direction opposite to the operation direction D3 of the operation member 9 is restricted. The slide restriction surface 96 is positioned on a side opposite to the release inclination surface 95 in the operation direction D3. The slide restriction surface 96 need only be able to restrict sliding in a direction opposite to the operation direction D3 of the operation member 9, and any shape may be adopted. For example, a shape extending in a direction orthogonal to the first direction D1 (operation direction D3) can be adopted. The slide restriction surface 96 may be formed continuously from the release inclination surface 95 or may be formed away from the release inclination surface 95. When the release inclination surface 95 and the slide restriction surface 96 are away from each other, a guide surface, for example, extending in a direction parallel to the first direction D1 may be formed between the release inclination surface 95 and the slide restriction surface 96.

The release inhibition surface 97 is a guide surface which inhibits the lock pin 5 from being pulled out from the engagement recess portion 26 in the pre-slide state. The release inhibition surface 97 is positioned on a side opposite to the guide rail 2 and the moving member 3 with respect to the release pin 8 in the pre-slide state. Therefore, the pair of abutment surfaces 94 and 94 are formed to have J-shapes (U-shapes) due to the release inclination surfaces 95, the slide restriction surfaces 96 and the release inhibition surfaces 97. The release inhibition surface 97 need only be able to inhibit the lock pin 5 from being pulled out from the engagement recess portion 26 in the pre-slide state, and any shape may be adopted. In the present embodiment, the release inhibition surface 97 extends in a direction parallel to the first direction D1. The length of the release inhibition surface 97 in the first direction D1 is not particularly limited. For example, as long as the release inhibition surface 97 does not hinder the release pin 8 guided by the release inclination surface 95, it may extend to a position facing the release inclination surface 95. The release inhibition surface 97 may be formed continuously from the slide restriction surface 96 or may be formed away from the slide restriction surface 96. When the slide restriction surface 96 and the release inhibition surface 97 are away from each other, a guide surface, for example, extending in a direction parallel to the first direction D1 may be formed between the slide restriction surface 96 and the release inhibition surface 97.

As illustrated in FIGS. 1 to 7, the second biasing member 10 is a member which biases the operation member 9 in a direction away from the holder 6 in the first direction D1 which is the slide direction of the operation member 9 with respect to the holder 6. That is, the second biasing member 10 biases the operation member 9 in a direction opposite to the operation direction D3. Consequently, the release pins 8 are pressed to the slide restriction surfaces 96 of the operation member 9. Therefore, the operation member 9 is held in the pre-slide state due to biasing forces of the first biasing member 7 and the second biasing member 10. As the second biasing member 10, for example, an elastic expanding/contracting member such as a compression coil spring can be used.

As described above, in the anchor position adjustment device according to the present embodiment, when the lock pin 5 is inserted into the engagement recess portion 26 due to a biasing force of the first biasing member 7, the lock pin 5 and the engagement recess portion 26 engage with each other, and movement of the moving member 3 with respect to the guide rail 2 is restricted. Further, when the operation member 9 slides, the release inclination surface 95 guides the release pin 8, and therefore the lock pin 5 is pulled out from the engagement recess portion 26. Consequently, the lock pin 5 and the engagement recess portion 26 are disengaged from each other, and thus restriction on movement of the moving member 3 with respect to the guide rail 2 is released. Therefore, the moving member 3 can move with respect to the guide rail 2. That is, a height position of the anchor 102 supporting the seatbelt 101 can be adjusted. Further, the release inhibition surface 97 inhibiting the lock pin 5 from being pulled out from the engagement recess portion 26 in the pre-slide state is formed in the operation member 9. Therefore, the moving member 3 can be prevented from moving with respect to the guide rail 2 when significant vibration is generated in a vehicle.

In addition, the release inhibition surface 97 is positioned on a side opposite to the guide rail 2 with respect to the release pin 8. Therefore, even if significant vibration is generated in a vehicle and the lock pin 5 is about to be pulled out from the engagement recess portion 26 due to an inertial force, the release pin 8 abuts the release inhibition surface 97, and therefore the lock pin 5 can be better prevented from being pulled out from the engagement recess portion 26.

In addition, the release inhibition surface 97 extends in a direction orthogonal to the inserting/pulling direction D2. Therefore, when significant vibration is generated in a vehicle and the release pin 8 abuts the release inhibition surface 97, the operation member 9 can be prevented from moving in the first direction D1. Consequently, the lock pin 5 can be better prevented from being pulled out from the engagement recess portion 26.

Hereinabove, an embodiment of the present invention has been described. However, the present invention is not limited to the foregoing embodiment.

Figure 10:
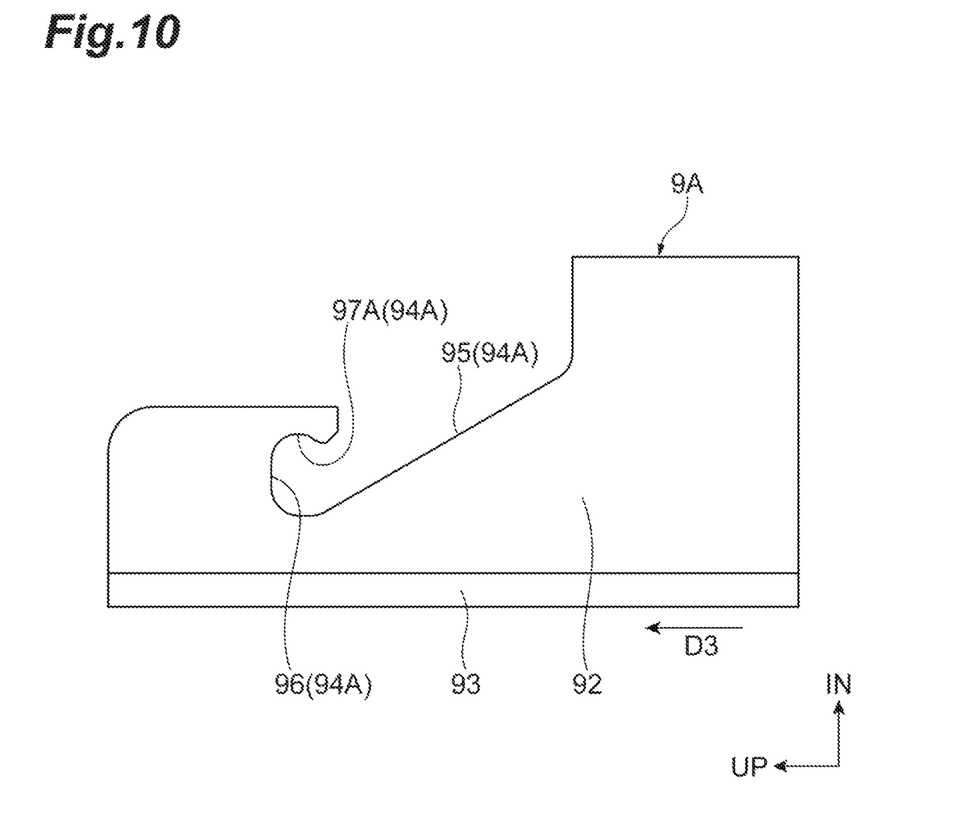
FIG. 10 is a front view illustrating an operation member of a modification example.
Figure 11:
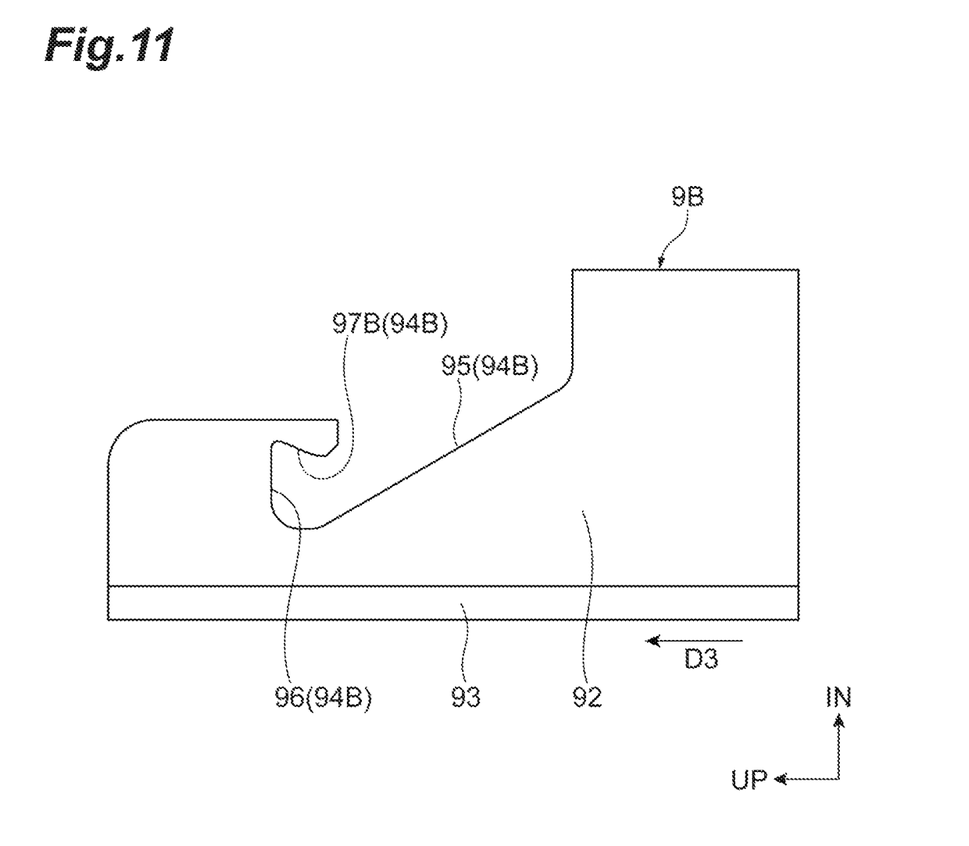
FIG. 11 is a front view illustrating an operation member of another modification example.

For example, in description of the operation member of the foregoing embodiment, a release inhibition surface on an abutment surface extends in a direction parallel to the first direction D1. However, for example, as in an operation member 9A illustrated in FIG. 10, a release inhibition surface 97A on an abutment surface 94A may be formed to be an arc surface or a concave surface. In addition, as in an operation member 9B illustrated in FIG. 11, a release inhibition surface 97B on an abutment surface 94B may be formed to be an inclination surface inclined in a direction away from the guide rail 2 progressively toward the operation direction D3. In any cases, when significant vibration is generated in a vehicle and the release pin 8 abuts the release inhibition surface 97, the operation member 9 can be prevented from moving in the first direction D1.

Figure 12:
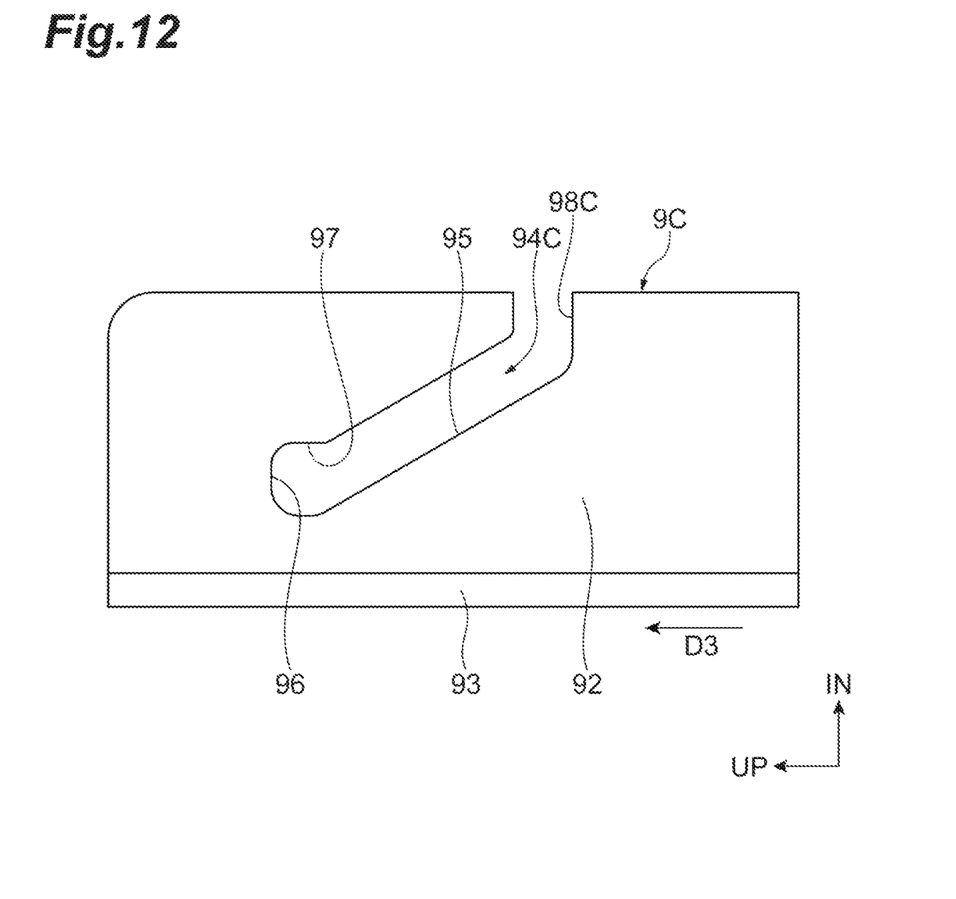
FIG. 12 is a front view illustrating an operation member of another modification example.

In addition, in description of the operation member of the foregoing embodiment, a release inclination opens on a side opposite to the guide rail 2. However, for example, as in an operation member 9C illustrated in FIG. 12, a slit 94C may be formed such that a release pin is inserted thereinto, and a surface of this slit 94C on the guide rail 2 side may serve as the release inclination surface 95. In the slit 94C, an opening 98C is formed on a surface of the operation member 9C on a side opposite to the guide rail 2, and the release pin can be inserted into the slit 94C through this opening 98C.

REFERENCE SIGNS LIST

1 Anchor position adjustment device
2 Guide rail
21 Upper fixing portion
22 Lower fixing portion
23 Outer surface
24 Inner surface
25 Rail portion
26 Engagement recess portion
3 Moving member
31 Slide portion
32 Anchor attachment portion
33 Penetration hole
4 Buffer plate
41 Slide portion
5 Lock pin
6 Holder
61 Lock pin support portion
62 Slide groove
7 First biasing member (biasing member)
8 Release pin
9 Operation member
9A Operation member
9B Operation member
9C Operation member
10 Second biasing member
91 Base portion
92 Side wall portion
93 Rail
94 Abutment surface
94A Abutment surface
94B Abutment surface
94C Slit
95 Release inclination surface
96 Slide restriction surface
97 Release inhibition surface
97A Release inhibition surface
97B Release inhibition surface
98C Opening
100 Vehicle
101 Seatbelt
102 Anchor
103 Pillar
D1 First direction
D2 Inserting/pulling direction
D3 Operation direction

The invention claimed is:

1. An anchor position adjustment device adjusting a position of an anchor supporting a seatbelt, the anchor position adjustment device comprising:
a guide rail fixed to a vehicle body and having a plurality of engagement recess portions formed to be arranged in a first direction;
a moving member attached to the guide rail in a slidable manner in the first direction and having the anchor attached thereto;
a lock pin provided in the moving member such that the lock pin is able to move in an inserting/pulling direction with respect to the plurality of engagement recess portions;
a biasing member biasing the lock pin in the inserting direction of the lock pin with respect to the plurality of engagement recess portions;
a release pin extending in a direction intersecting with the inserting/pulling direction from the lock pin; and
an operation member attached to the moving member in a slidable manner,
wherein the operation member has:
a release inclination surface guiding the release pin in the pulling direction of the lock pin with respect to the plurality of engagement recess portions in accordance with sliding of the operation member;
a release inhibition surface inhibiting the lock pin from being pulled out from the plurality of engagement recess portions in a pre-slide state before the operation member slides; and
a slide restriction surface restricting sliding of the operation member when the release pin abuts the slide restriction surface, and
wherein, in a slide direction of the operation member, when a direction in which the operation member slides from the pre-slide state and the lock pin is pulled out from the plurality of engagement recess portions is referred to as an operation direction, the release inhibition surface is positioned on a side opposite to the guide rail with respect to the release pin and extends to a position facing the release inclination surface, whereby a distance between the release inclination surface and the release inhibition surface in a direction perpendicular to the release inclination surface increases toward the operation direction, and the release inclination surface and the release inhibition surface are connected to the slide restriction surface.

2. An anchor position adjustment device adjusting a position of an anchor supporting a seatbelt, the anchor position adjustment device comprising:

a guide rail fixed to a vehicle body and having a plurality of engagement recess portions formed to be arranged in a first direction;

a moving member attached to the guide rail in a slidable manner in the first direction and having the anchor attached thereto;

a lock pin provided in the moving member such that the lock pin is able to move in an inserting/pulling direction with respect to the plurality of engagement recess portions;

a biasing member biasing the lock pin in an inserting direction of the lock pin with respect to the plurality of engagement recess portions;

a release pin extending in a direction intersecting with the inserting/pulling direction from the lock pin; and an operation member attached to the moving member in a slidable manner, wherein the operation member has:

a release inclination surface guiding the release pin in a pulling direction of the lock pin with respect to the plurality of engagement recess portions in accordance with sliding of the operation member;

a release inhibition surface inhibiting the lock pin from being pulled out from the plurality of engagement recess portions in a pre-slide state before the operation member slides; and a slide restriction surface restricting sliding of the operation member when the release pin abuts the slide restriction surface, and wherein, in a slide direction of the operation member, when a direction in which the operation member slides from the pre-slide state and the lock pin is pulled out from the plurality of engagement recess portions is referred to as an operation direction, the release inhibition surface is positioned on a side opposite to the guide rail with respect to the release pin and is formed to be an arc surface or a concave surface that is recessed in direction away from the guide rail, whereby a distance between the release inclination surface and the release inhibition surface in a direction perpendicular to the release inclination surface increases toward the operation direction, and the release inclination surface and the release inhibition surface are connected to the slide restriction surface.

3. An anchor position adjustment device adjusting a position of an anchor supporting a seatbelt, the anchor position adjustment device comprising:

a guide rail fixed to a vehicle body and having a plurality of engagement recess portions formed to be arranged in a first direction;

a moving member attached to the guide rail in a slidable manner in the first direction and having the anchor attached thereto;

a lock pin provided in the moving member such that the lock pin is able to move in an inserting/pulling direction with respect to the plurality of engagement recess portions;

a biasing member biasing the lock pin in an inserting direction of the lock pin with respect to the plurality of engagement recess portions;

a release pin extending in a direction intersecting with the inserting/pulling direction from the lock pin; and an operation member attached to the moving member in a slidable manner, wherein the operation member has:

a release inclination surface guiding the release pin in a pulling direction of the lock pin with respect to the plurality of engagement recess portions in accordance with sliding of the operation member;

a release inhibition surface inhibiting the lock pin from being pulled out from the plurality of engagement recess portions in a pre-slide state before the operation member slides; and a slide restriction surface restricting sliding of the operation member when the release pin abuts the slide restriction surface, and wherein, in a slide direction of the operation member, when a direction in which the operation member slides from the pre-slide state and the lock pin is pulled out from the engagement recess portion is referred to as an operation direction, the release inhibition surface is positioned on a side opposite to the guide rail with respect to the release pin and is formed to be an inclination surface inclined in a direction away from the guide rail toward the operation direction, whereby a distance between the release inclination surface and the release inhibition surface in a direction perpendicular to the release inclination surface increases toward the operation direction, and the release inclination surface and the release inhibition surface are connected to the slide restriction surface.

\* \* \* \* \*